United States Patent
Weber et al.

(10) Patent No.: US 9,816,624 B2
(45) Date of Patent: Nov. 14, 2017

(54) MIXED MEDIA ORBITAL VALVE

(71) Applicant: MAG Aerospace Industries, LLC, Carson, CA (US)

(72) Inventors: Sebastien Weber, Irvine, CA (US); Tim Birbeck, Torrance, CA (US); Nguyen Tram, Chino Hills, CA (US); Razmik B. Boodaghians, Glendale, CA (US); Kevin Huang, Hermosa Beach, CA (US)

(73) Assignee: MAG Aerospace Industries, LLC, Carson, CA (US)

(*) Notice: Subject to any disclaimer, the term of this patent is extended or adjusted under 35 U.S.C. 154(b) by 0 days.

(21) Appl. No.: 15/257,254

(22) Filed: Sep. 6, 2016

(65) Prior Publication Data

US 2016/0377185 A1    Dec. 29, 2016

Related U.S. Application Data

(63) Continuation of application No. 14/930,830, filed on Nov. 3, 2015, now Pat. No. 9,441,739, which is a continuation of application No. 13/833,426, filed on Mar. 15, 2013, now Pat. No. 9,182,042.

(51) Int. Cl.
| | |
|---|---|
| *F16K 3/08* | (2006.01) |
| *F16K 3/02* | (2006.01) |
| *B64D 11/02* | (2006.01) |
| *E03D 5/012* | (2006.01) |

(52) U.S. Cl.
CPC ............. *F16K 3/085* (2013.01); *B64D 11/02* (2013.01); *E03D 5/012* (2013.01); *F16K 3/0209* (2013.01); *F16K 3/0254* (2013.01); *F16K 3/08* (2013.01)

(58) Field of Classification Search
CPC . F16K 3/00; F16K 3/02; F16K 3/0209; F16K 3/0281; F16K 3/06; F16K 3/08; F16K 3/085; E03F 1/006
USPC ................. 251/193–204, 301–303, 326–329
See application file for complete search history.

(56) References Cited

U.S. PATENT DOCUMENTS

| | | | | |
|---|---|---|---|---|
| 6,325,356 | B1 * | 12/2001 | Rozenblatt | B64D 11/02 251/301 |
| 8,672,295 | B2 * | 3/2014 | Dhawan | F16K 3/0209 251/174 |

FOREIGN PATENT DOCUMENTS

DE              703613         *   3/1941

* cited by examiner

*Primary Examiner* — Marina Tietjen
(74) *Attorney, Agent, or Firm* — Kilpatrick Townsend & Stockton LLP; Dean W. Russell; Kristin M. Crall

(57) ABSTRACT

Embodiments of the invention described herein thus provide improved flush valves that are designed with improved venting features and improved inlet designs. The described venting features and inlet designs, either alone or in combination, can help prevent ingestion of waste into the interior of the valve.

8 Claims, 2 Drawing Sheets

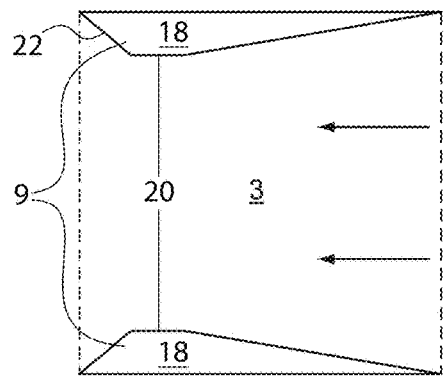
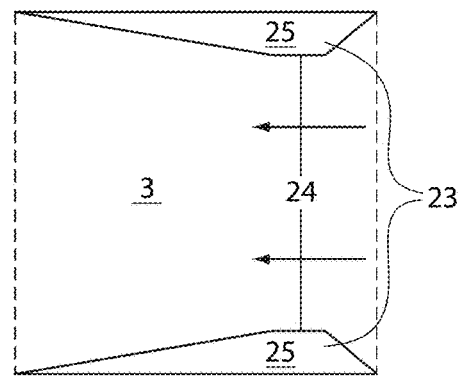
FIG. 3          FIG. 4
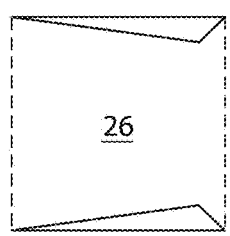
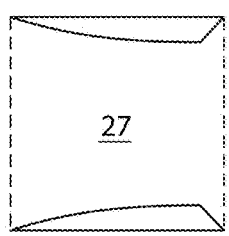
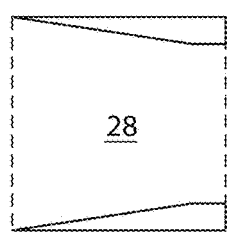
Fig. 5A      Fig. 5B      Fig. 5C
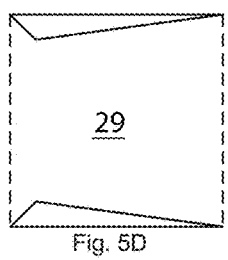
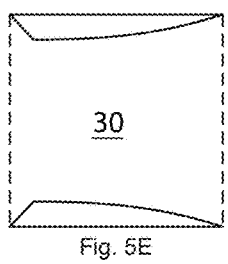
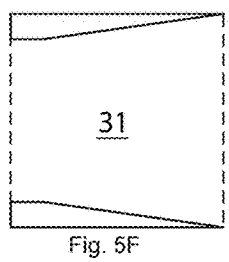
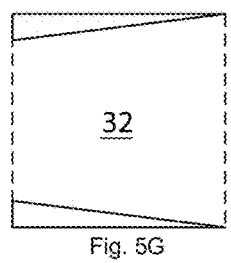
Fig. 5D      Fig. 5E      Fig. 5F      Fig. 5G

MIXED MEDIA ORBITAL VALVE

CROSS-REFERENCE TO RELATED APPLICATIONS

This application is a continuation of U.S. patent application Ser. No. 14/930,830, filed Nov. 3, 2015, titled "Mixed Media Orbital Valve," now allowed, which application is a continuation of U.S. application Ser. No. 13/833,426, filed Mar. 15, 2013, titled "Mixed Media Orbital Valve," now issued as U.S. Pat. No. 9,182,042, the entire contents the each of which are hereby incorporated by reference.

FIELD OF THE INVENTION

Embodiments of the present invention relate generally to orbital valves for use in controlling the direction of mixed media, and find particular use in connection with toilet systems, such as vacuum toilet systems.

BACKGROUND

Aircraft and other passenger transport vehicles typically have on-board lavatories with vacuum toilet systems. These systems typically include a waste-receiving toilet bowl connected to a main waste tank via a sewer pipe or main waste line. A discharge or flush valve is typically mounted on the sewer pipe to selectively allow fluid communication between the toilet bowl and the main waste tank. To power the toilet system, the waste reservoir is maintained under a pressure that is substantially lower than the pressure in the waste-receiving toilet bowl, which is typically under the near-atmospheric pressure of the aircraft's passenger cabin. Thus, when the discharge valve is opened, the pressure differential between the bowl and the reservoir causes the waste in the bowl to be drawn through the pipe into the waste reservoir.

These discharge valves typically have a cylindrical housing with an inner chamber sized to contain a disk-shaped plate with a hole therein. One side of the housing has an inlet that is generally aligned with an outlet that is located on the opposite side of the housing. The waste-receiving toilet bowl is connected to the inlet by one portion of a sewer pipe, and the main waste tank is connected to the outlet of the valve housing via another portion of the sewer pipe.

A drive mechanism selectively rotates the disk-shaped plate between an open position and a closed position. In the open position, the hole in the disk-shaped plate is aligned between the inlet and the outlet, which allows fluid communication for the flushing of the vacuum toilet. In the closed position, the hole in the plate is moved away from the inlet and outlet area, such that it blocks fluid communication between the inlet and the outlet, preventing fluid flow from the pressure differential between the bowl and the reservoir.

In vacuum waste systems, this differential pressure is what drives the collected mixed media (which can be human waste along with other waste items, such as paper products) from the toilet bowl into the accumulation point (which is typically the main waste tank). The discharge valve should provide an interface for such a vacuum system without venting the pressure differential completely. It should also allow for the controlled addition of material into the ambient-pressure environment, while providing a leak-free obstruction that can be moved or rotated in a controlled manner so as to allow for the passage of a mixed media bolus from the ambient-pressure environment (e.g., the toilet bowl) to the low pressure environment (e.g., the waste tank). The discharge valve is then returned to its closed position in order to prevent further movement of media and/or waste into the waste tank until the next flush is activated. One example of a valve for use with a vacuum toilet is shown and described by co-owned U.S. Pat. No. 6,325,356.

While many discharge or flush valves are available that achieve these tasks, a number of problems have arisen associated with their reliability due to the deleterious nature of human waste on mechanical devices. For example, due to the high degree of differential pressure being controlled by the flush valve, waste may be ingested into the interior of the valve housing during the flush process, which contributes to corrosion of internal components. Additionally, ingested waste may dry and harden, preventing the actuation of the flush valve and significantly reducing the reliability of the valve. It is thus desirable to provide improved flush valves that seek to prevent ingestion of waste into the interior of the valve, which can improve the reliability and lifespan of the valve.

BRIEF SUMMARY

Embodiments of the invention described herein thus provide improved flush valves that are designed with improved venting features and improved inlet designs. The described venting features and inlet designs, either alone or in combination, can help prevent ingestion of waste into the interior of the valve.

BRIEF DESCRIPTION OF THE DRAWINGS

FIG. 3 shows a close-up view of one embodiment of an inlet for a flush valve.

FIG. 4 shows a close-up view of an alternate embodiment of an inlet for a flush valve.

FIGS. 5A-5G show alternate shapes that may be used for an inlet of a flush valve.

DETAILED DESCRIPTION

Embodiments of the present invention provide an improved mixed media valve system 12 that functions as a flush valve for a vacuum toilet. Although the mixed media valve system 12 is described for use with a toilet system, and specifically for use with a vacuum toilet for use on-board a passenger vehicle such as an aircraft, it should be understood that this valve system may be used with any other system that seeks to use a valve across a pressure differential situation and/or a valve that can transport mixed media. Examples of alternate uses include but are not limited to facility-based vacuum waste systems, facility-based vacuum transport systems, mixed media processes in oil and gas industries, conditional overboard venting in aerospace applications, or any other appropriate instance when a mixed media valve is needed.

Figure 2:
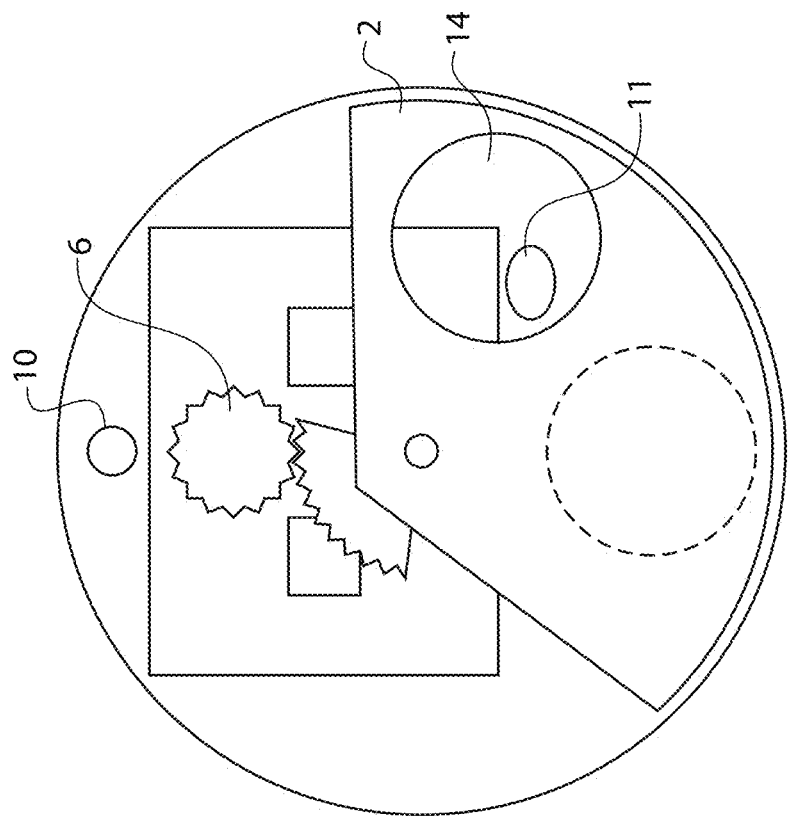
FIG. 2 shows a front plan view of the valve of FIG. 1.
Figure 1:
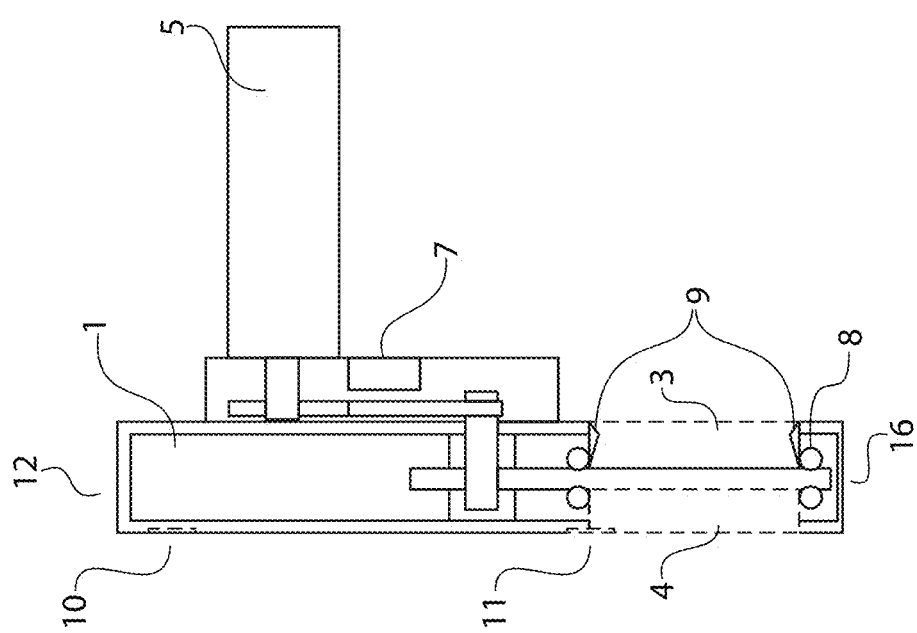
FIG. 1 shows a partial cross sectional view of an orbital flush valve according to one embodiment of the invention.

The improved mixed media valve system 12 includes a valve housing 1 which encloses a flush plate 2. As shown in FIG. 1, the valve housing 1 has a media inlet 3 and a media outlet 4. In use, the media inlet 3 provides a connection for the sewer pipe to a waste-receiving toilet bowl. In other words, waste travels into the valve system 12 through inlet 3. The media outlet 4 provides a connection for the sewer pipe to the main waste tank such that waste travels out of the valve system 12 through outlet 4. The flush plate 2 is generally formed as a plate 2 that is interposed between the inlet 3 and outlet 4. As shown in FIG. 2, plate 2 may be formed as a pie-shaped wedge or a section of a circle. Plate 2 has a media bore-hole 14 that moves across an interface 16 between the media inlet 3 and media outlet 4.

Movement of the plate 2 is controlled by driving action of an actuator or motor 5, which is transferred by a gear assembly 6. The actuator or motor 5 is controlled by a position sensing mechanism 7, which allows the plate 2 to move. The plate 2 can either be moved to block the interface 16 between the inlet 3 and the outlet 4 (i.e., when it is moved to a nonalignment positioned with the inlet and the outlet), thus preventing any transfer of vacuum or transfer of a mixed media bolus from an ambient-pressure environment on the inlet side to a low pressure environment on the outlet side, or it can be moved to unblock the interface 16. If the plate 2 is moved to unblock the interface 16 between inlet 3 and outlet 4, the motor 5 moves the plate 2 so that the media bore-hole 14 of the flush plate 2 is aligned with both the valve inlet 3 and the valve outlet 4. This provides a fluid passageway between the toilet bowl and the waste tank.

The flush plate 2 is sealed at the interface 16 between the valve interior and the waste system by reactive seals 8 on both the media inlet 3 and the media outlet 4. These seals 8 function to prevent the ingestion of media into the interior of the valve in the static condition. However, during actuation of the valve, further features are needed in order to prevent ingestion of media into the interior of the valve because the seals are not pressed tightly against the plate 2 during its movement.

Accordingly, in a first embodiment, the wall profile 9 of the media inlet 3 is designed or adjusted to shape the stream of incoming media. This adjustment may be accomplished via a separate insert that is positioned in the wall of the inlet 3 to provide the desired shape, or it may be accomplished by extruding or otherwise forming the valve inlet in the desired shape during manufacture. The function of the inlet profile is to disrupt the flow of waste media such that the resulting change in flow can direct the bulk movement of the media through the media bore-hole of the flush plate without deflection into the valve housing.

As illustrated by FIG. 3, in one embodiment, the valve inlet 3 is shaped such that the inward flow (shown as arrows) of waste and other mixed media preferentially avoids the gap that is created between the valve seal 8 and the flush plate 2 during the actuation period. FIG. 3 shows inwardly angled side walls 18 of the inlet 3 that provide a narrowed or tapered channel 20. The walls of the inlet 3 then widen at the innermost part 22 of the inlet 3 (i.e., where the inlet would cooperate with the flush plate 2 in use). This configuration is believed to focus the bulk flow of the media with a smooth transition, and guide it through the valve.

In another embodiment, valve inlet 3 is shaped such that the edge furthest from the flush plate, the leading edge 23 functions to provide a narrowed channel 24 for the incoming flow of media. The channel widens at its innermost part (where the inlet cooperates with the flush plate 2 in use) via tapered walls 25 that taper upwardly before walls 25 reach the flush plate. It is envisioned that the resulting vortices created behind the leading edge 23 taper act to displace the media from areas where a fluid path into the valve interior exists.

Multiple optional inlet wall profiles are illustrated in FIGS. 5A-5G. The configuration selected or proposed depends upon the specific media density and velocity. Embodiments may provide a complete taper, such that they provide a triangular insert area/straight line or they may have a taper that levels off to a short side. Other embodiments may provide a curved transition as to reduce turbulence in high velocity applications.

Without wishing to be bound to any theory, it is believed that varying the channel width and the wall taper options may help control the pathway through the valve. These options may be varied depending upon the desired pathway to be designed. The specific scale of the tapering may be altered and it is believed to be within the purview of one of ordinary skill in the art to optimize the taper and leading edge dimensions, depending upon the requirements of the particular system. For example, aerospace requirements establish lower limits on waste lines such that the waste lines must be larger than the narrowest portion of the waste system, the toilet bowl neck. Other systems may have different requirements, leading to a different optimized design.

In addition to the wall profiles 9 of the shaped inlets 3, the valve system 12 may also provide an improved venting feature. This feature may be used in addition to or separately from the above-discussed wall profiles 9. In the venting embodiment, the valve housing 1 is vented via a vent 11 in one or more places on the ambient pressure side. As shown in FIG. 2, many valves currently have an existing vent 10 that is located adjacent to a void of the valve interior such that it remains unimpeded by the furthest actuation extent of the flush plate. The new valve system 12 provides an additional vent 11 located adjacent to the interface point of the flush plate and valve seals. Accordingly, the pressure differential that would otherwise encourage media ingestion is alleviated, and vented air is used to further drive flush media from the ingestion pathway.

In use, differential pressure built up within the valve interior during the initial steps of valve actuation act to pull flush media into the interior of the valve. A vent 11 near the interface point of the flush plate 2 and valve seals 8 mitigates the build-up of differential pressure by drawing in an ambient airstream that is actively used to counteract the momentum of any media that would otherwise penetrate the seal interface.

The vent 11 orientation can be angled in a manner that is beneficial to directing the airflow. This can include a perpendicular or angled orientation with relation to the valve housing surface 1. The vent 1 shape may be circular, oblate, or irregularly shaped, depending on the shape required to achieve directed airflow function for the desired application.

A fitting may be bonded to the vent hole to allow further control of airflow, velocity, and direction. Such a fitting may also be required in order to meet aerospace requirements for flood-line level. Vent 11 may be required to vent to location above the highest possible flood-level line such that the valve interior will not leak through vent 11 in the case of a catastrophic seal failure. For this purpose, tubing may be attached to a vent fitting on one end, while the opposing end is generally located above the flood-level line. This configuration is required for some of the existing vents 10 currently in use.

In aircraft toilet embodiments, the vent 11 provides a pathway between the valve interior and the ambient conditions immediately outside valve. If vent 11 is installed in an aircraft toilet environment, the installation location may be behind the wall panels of the pressurized cabin space.

Changes and modifications, additions and deletions may be made to the structures and methods recited above and shown in the drawings without departing from the scope or spirit of the invention and the following claims.

What is claimed is:

1. A mixed media orbital valve, comprising:
  (a) a valve housing comprising an inlet and an outlet, the inlet providing a connection for a sewer pipe to a waste-receiving vacuum toilet bowl and configured to receive incoming media, the outlet providing a connection for a sewer pipe to a main waste tank under vacuum;
  (b) a flush plate housed within the valve housing and interposed between the inlet and the outlet, the flush plate having a media bore hole that, when actuated, either
    (i) moves into an alignment position with the inlet and the outlet in order to allow passage of media through the valve or (ii) moves to a nonalignment position with the inlet and the outlet in order to block the valve;
  (c) one or more valve seals positioned at an interface between the valve housing and the flush plate;
  wherein the inlet comprises inwardly angled side walls that comprise a leading edge farthest from the flush plate in use, wherein the leading edge provides a narrowed channel for incoming flow of media such that the inward flow of media avoids a gap that is created between the one or more valve seals and the flush plate during actuation of the flush plate.

2. The valve of claim 1, wherein the inwardly angled side walls of the inlet provide a narrowed or tapered channel.

3. The valve of claim 2, wherein the walls of the inlet widen at an innermost part of the inlet where the inlet cooperates with the flush plate in use.

4. The valve of claim 1, wherein the channel widens at an innermost part where the inlet cooperates with the flush plate in use via tapered walls that taper from an opening of the inlet to a narrowed channel before walls reach the flush plate.

5. The valve of claim 1, wherein the valve comprises at least two vents, one of which is positioned near the interface point of the flush plate and the one or more valve seals.

6. The valve of claim 5, wherein a pressure differential that would otherwise encourage media ingestion is alleviated via the vent as vented air is used to further drive flush media from any gap that is created between the one or more valve seals and the flush plate during actuation of the flush plate.

7. The valve of claim 1, wherein the mixed media orbital valve is mounted between two portions of a sewer pipe connecting a waste-receiving toilet bowl and a main waste tank.

8. The valve of claim 1, wherein the valve is mounted on an aircraft vacuum toilet system.

* * * * *